No. 812,118. PATENTED FEB. 6, 1906.
J. E. G. DENIS & L. M. J. DE BOISSE.
DRIVING AXLE FOR AUTOMOBILE VEHICLES.
APPLICATION FILED JUNE 14, 1904.

WITNESSES:

INVENTORS

UNITED STATES PATENT OFFICE.

JULES EUGÈNE GUSTAVE DENIS AND LOUIS MARIE JACQUES DE BOISSE, OF PARIS, FRANCE.

DRIVING-AXLE FOR AUTOMOBILE VEHICLES.

No. 812,118.    Specification of Letters Patent.    Patented Feb. 6, 1906.

Application filed June 14, 1904. Serial No. 212,519.

*To all whom it may concern:*

Be it known that we, JULES EUGÈNE GUSTAVE DENIS and LOUIS MARIE JACQUES DE BOISSE, citizens of the French Republic, and residents of 38 Rue de Chanzy, Paris, France, have invented a certain new and useful Driving-Axle for Automobile Vehicles, of which the following is a full, clear, and exact description, (for which we have applied for Letters Patent in France, dated June 25, 1903, No. 333,385, and in Germany, dated December 19, 1903,) of which the following is a specification.

This invention relates to an arrangement of rear driving-axle for automobile carriages of the type in which the power is transmitted by a cardan or propeller-shaft located in the longitudinal axis of the vehicle, the motor being placed in front thereof. A description of this driving-axle is hereinafter given with reference to the accompanying drawings, in which—

Figure 1:
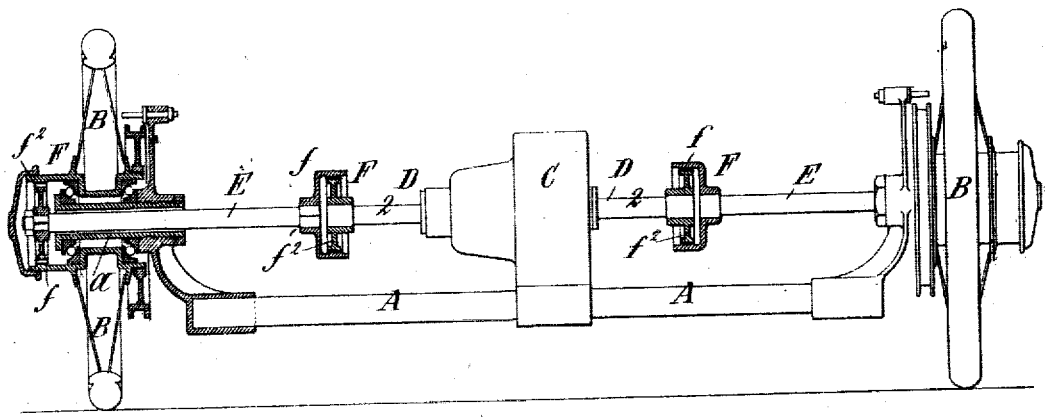
Figure 2:
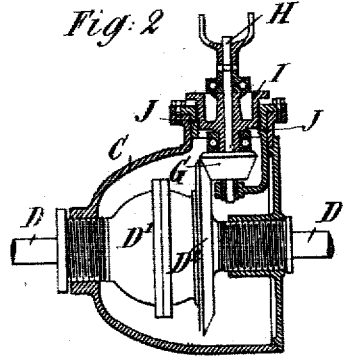
Figure 3:
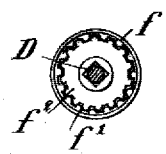

Figure 1 shows the whole of the axle with its wheels, part in elevation and part in section. Fig. 2 shows the interior arrangement of the central gear-box in horizontal section on line 2 2 of Fig. 1. Fig. 3 is a detail view showing one of the joints of the axle regarded perpendicularly to the axis.

This driving or live axle comprises a member A parallel to the driving-shaft forming the "axle," properly so called, placed parallel to and below the shaft and which forms a rigid framework or bridge, to which are secured the bearings of the axle, the axles of the wheels, as well as the gear-case containing the gear-wheels, by means of which power is transmitted from the longitudinal shaft to the differential of the axle. This member or bridge A preferably consists of a tube made as rigid as possible. Each of the two wheels B B is journaled, by means of ball-bearings, upon axles formed of tubes *a*, secured fast to the tubular bridge or framework A.

In the gear-case C, which is composed of a box of suitable shape fast to the bridge-tube A, are journaled the axle proper and the end of the longitudinal propeller-shaft. The axle proper is formed of three parts D E E. One of these, D, which is that comprising the differential and driven by the propeller-shaft, is journaled in the gear-case C, through which it passes from side to side, the balance-gear being located within this gear-case. The two other parts E E thereafter transmit the power to the wheels B. The part D is connected to the parts E E, and these are connected to the wheels B by means of driving fingers or devices which allow between these different parts a slight play. Such play allows the axle to have very small deformations or distortions which it is called on to assume by reason of the shocks and concussions to which it is subjected when traveling. We obtain in these conditions a better mechanical efficiency than that which is afforded by a rigid axle incapable of assuming these deformations which would be transformed into friction.

The part D of the axle journaled in the gear-case C comprises the differential D', of which the casing carries the bevel-wheel $D^2$, with which engages the bevel-pinion G, fast to the propeller-shaft. The extremity of this longitudinal shaft is indicated at H, and this shaft transmits the power of the engine by means of cardan or universal joints according to well-known arrangements. This shaft H is at its entrance into the gear-case C journaled by means of an arrangement which enables the meshing of the pinion G with the gear-wheel $D^2$ to be exactly adjusted. For this purpose the shaft H is journaled by means of ball-bearings in a sleeve I, which is formed of a screw-threaded socket screwed into another interiorly-screw-threaded socket J, fixed to the gear-case C. By screwing the socket I into the socket J we can exactly regulate the position of the pinion G relatively to the gear-wheel $D^2$. This adjustment is very useful for transmission of this kind, the mechanical efficiency of which is very often lessened by bad adjustment of the engagement of the pinion at the end of the shaft with the differential gear.

The arrangement of the four connections F is shown in Fig. 1 in longitudinal section. Fig. 3 shows one of them viewed perpendicularly to the axis. This arrangement comprises a drum *f*, upon the internal flange of which are formed small recesses *f'*, spaced out in crown fashion. Into this drum, which is fast to one of the two portions of the axle which are to be connected, is passed a head fast to the other portion of the axle and which consists of a plate $f^2$, furnished at its periphery with teeth designed to enter the recesses in the drum aforesaid, allowing slight play, so as to render solid the two portions of the axle in their movement of rotation, while at the same time leaving slight play which allows this axis to take up slight deformations or distortions. The connection of the two parts of the axle E E to the wheels B is effected by means of similar joint devices, the portion $f$ being fast to the nave of the wheel and the portion $f^2$ fast to the part E of the axle. With four joint devices thus placed the axle D E E possesses a certain flexibility which enables it to be slightly distorted when it receives a shock during travel. This power of deformation, although slight, insures a marked increase in efficiency.

The invention is not strictly limited to the details illustrated, and it can be carried out with certain modifications of a constructional nature which do not materially change the general arrangement.

Having thus described our invention, what we claim as such, and desire to secure by Letters Patent, is—

1. In a live axle for automobile vehicles, the combination with a central shaft having a differential gear arranged thereon and toothed disks at the extremities of said shafts, of end shafts having internally-toothed drums meshing with said toothed disks, said end shafts also having toothed disks at their outer extremities, and of internally-toothed drums secured to the road-wheels, said road-wheel drums engaging the toothed disks upon outer extremities of the end shafts.

2. A live axle for automobile vehicles, comprising a bridge, a central shaft, end shafts journaled in said bridge, said central shaft coupled to said end shafts, a differential gear upon said central shaft, a gear-case to said differential gear, said central shaft being journaled in said gear-case, a socket screwed into said gear-case, said socket being thereby adjustable in said gear-case, and a propeller-shaft journaled in said socket, said propeller-shaft having means for engaging and driving the differential gear.

3. A live axle for automobile vehicles comprising a bridge, tubular ends to said bridge, a central shaft, end shafts journaled in said tubular ends and coupled to said central shaft, road-wheels revolubly mounted upon said tubular ends, toothed connections between said road-wheels and said end shafts, a differential gear upon said central shaft, a gear-case to said differential gear, said gear-case being secured to the bridge and forming journals for said central shaft, a bevel-wheel mounted upon said differential gear, a socket screw-threaded into said gear-case so as to be adjustable therein, a propeller-shaft journaled in and passing through said screwed socket, and a bevel-pinion upon the inner end of the propeller-shaft, said pinion engaging said bevel-wheel and being adjustable for wear.

In testimony whereof we have signed our names to this specification in the presence of two subscribing witnesses.

JULES EUGENE GUSTAVE DENIS.
LOUIS MARIE JACQUES DE BOISSE.

Witnesses:
GUSTAVE DUMONT,
HANSON C. COXE.